United States Patent [19]

Michoux et al.

[11] Patent Number: 4,760,897
[45] Date of Patent: Aug. 2, 1988

[54] SPRING FOR ASSEMBLING A DRUM BRAKE

[75] Inventors: Eric Michoux, Villiers Sur Marne; Michel Denree, Aulnay Sous Bois, both of France

[73] Assignee: Bendix France, Drancy, France

[21] Appl. No.: 73,922

[22] Filed: Jul. 15, 1987

[30] Foreign Application Priority Data

Jul. 23, 1986 [FR] France ............... 86 10694

[51] Int. Cl.4 ............................................. F16D 65/56
[52] U.S. Cl. ...................... 188/79.51; 188/106 A
[58] Field of Search ............... 188/78, 327, 79.5 P, 188/79.5 S, 106 A

[56] References Cited

U.S. PATENT DOCUMENTS

| | | | |
|---|---|---|---|
| 2,292,017 | 8/1942 | Smith | 188/79.5 |
| 3,194,352 | 7/1965 | Barnes | 188/106 A X |
| 4,174,770 | 11/1979 | Courbot | 188/79.5 |
| 4,420,486 | 9/1984 | Spitler | 188/79.5 |
| 4,657,119 | 4/1987 | Denree et al. | 188/79.5 |

FOREIGN PATENT DOCUMENTS

| | | | |
|---|---|---|---|
| 0146444 | 6/1985 | European Pat. Off. | |
| 2,262,926 | 7/1974 | Fed. Rep. of Germany | 188/79.5 P |
| 2155321 | 5/1973 | France | |
| 2378207 | 8/1978 | France | |
| 2419431 | 11/1979 | France | 188/79.5 P |
| 2514090 | 4/1983 | France | |
| 1,191,320 | 5/1970 | United Kingdom | 188/79.5 P |
| 2014673 | 8/1979 | United Kingdom | |

Primary Examiner—George E. A. Halvosa
Attorney, Agent, or Firm—Larry J. Palguta; Ken C. Decker

[57] ABSTRACT

The assembly spring consists of a V-shaped elastic metal wire (R1), one end of one branch (61) of which forms a hook (71) which ensures the retention of the pivot (52) of the lever (50), the branch (61) passing through a passage (81) provided in a spacer (44), in order to stress it elastically toward the lever (50) in interaction with the other branch of the V (91) which has a mechanism (101) of anchoring on the web (18) of the shoe (14) carrying the lever (50). The anchoring mechanism consists of a wire portion (101) bent at 90° relative to the plane of the V and interacting with the web (18) of the shoe (14) and the lever (50) adjacent it, to constitute a mechanism forming a stop. The invention is used for the braking of vehicles.

2 Claims, 3 Drawing Sheets

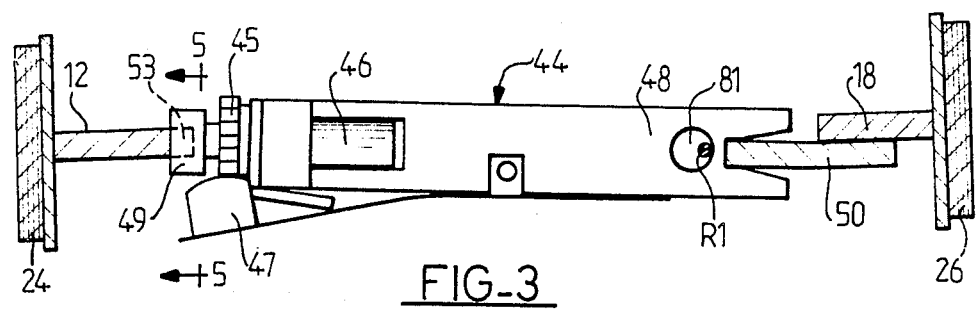
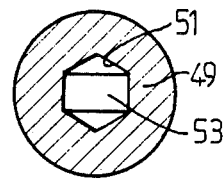
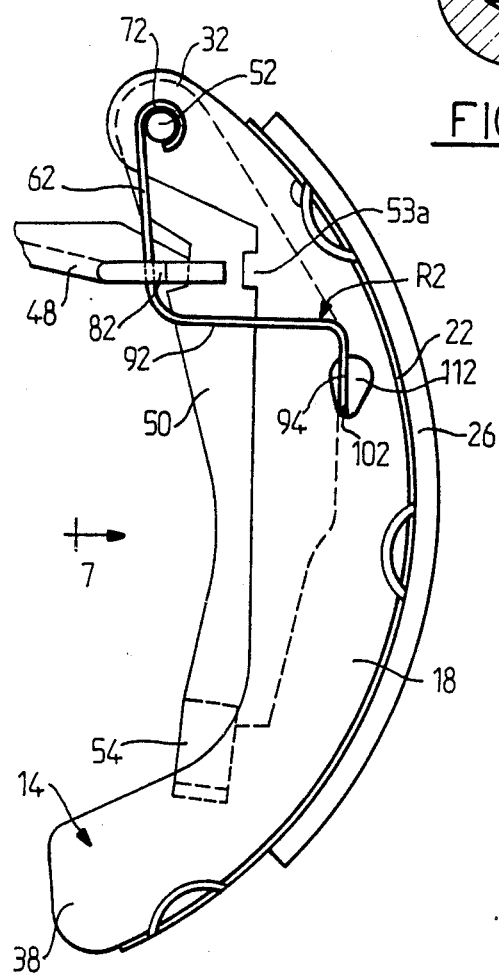
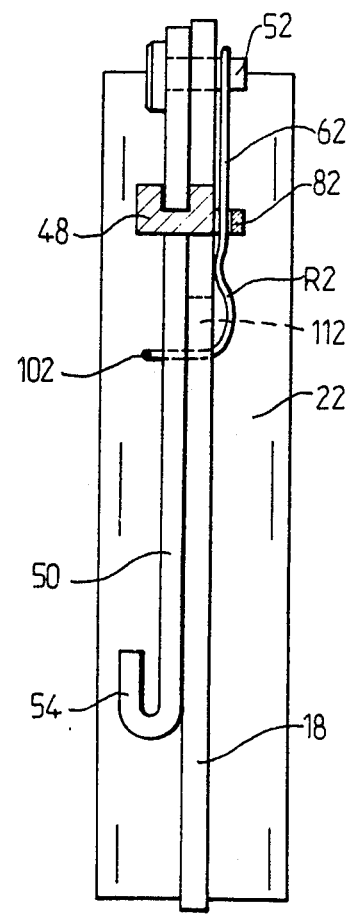
FIG_3
FIG_5
FIG_6
FIG_7

SPRING FOR ASSEMBLING A DRUM BRAKE

The invention relates to a spring for assembling a drum brake.

This brake is of the type comprising two shoes stressed towards the drum by a brake motor acting, counter to a restoring spring, on the first ends of the shoes, while their other ends interact with an anchoring block, one of the shoes carrying a handbrake lever articulated on a pivot adjacent to the first end of one of the shoes, the lever being connected to the shoes, by means of a spacer, one end of which is laid against the lever by a spring, the said lever having a stop which interacts with the web of the shoe carrying it and which acts counter to the spring in order to define the rest position of the lever.

Such a drum brake is described in EP-A No. 0,146,444.

It is therefore an object of the invention to provide an improvement to this known brake, which involves performing several functions by means of a single spring made of elastic wire, in that the spring stresses the spacer against the handbrake lever, the stop is provided between the web and the lever, and at the same time the pivot of the handbrake lever is immobilized.

According to the present invention, the spring consists of a V-shaped elastic metal wire, one end of a branch of which forms a hook which ensures the axial retention of the pivot of the lever, the branch passing through a passage provided in the spacer, in order to stress it elastically towards the lever in interaction with the other branch of the V which has means of anchoring on the web of the shoe carrying the lever and/or on the latter.

According to another feature of the invention, the anchoring means consist of a wire portion bent at 90° relative to the plane of the V and interacting with the web of the shoe and the lever adjacent to it, to constitute the said means forming a stop.

Because of the elasticity of the spring, it is possible to stress the bent wire portion at a distance from the point where it interacts with the web and the lever, thereby forming a stop, and this makes it possible to dismantle the brake easily.

The invention will now be described by way of example with reference to the accompanying drawings in which:

FIG. 3 is a view according to the arrow "3" of FIG. 2, showing a spacer arranged between the two shoes of the brake;

FIG. 5 is a sectional view along the line 5—5 of FIG. 3;

FIG. 6 shows a connection made by means of a spring between a shoe, the handbrake lever and the spacer according to a second embodiment;

FIG. 7 is a view according to the arrow "7" of FIG. 6;

Figure 1:
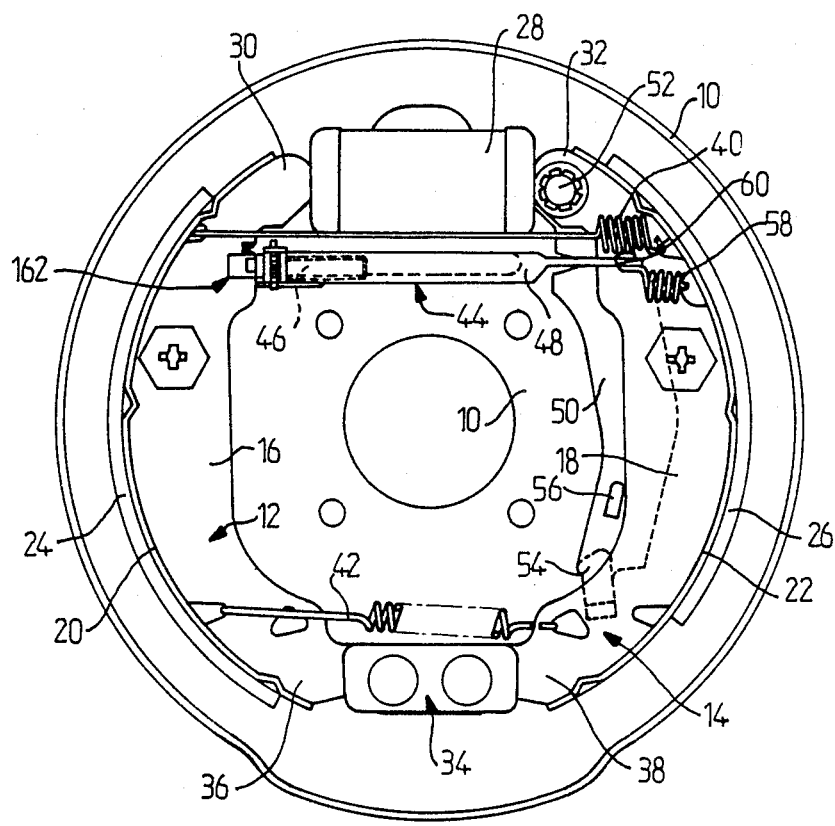
FIG. 1 shows a drum brake of a known type.

The known drum brake (EP-A No. 0,146,444) illustrated in FIG. 1 comprises a support plate 10 which is associated with a stationary part (not shown) of a vehicle and on which slide two brake shoes 12 and 14. Each of the shoes 12 and 14 comprises a substantially plane web 16, 18 and a curved rim 20, 22, to which a lining 24, 26 is fastened by means of rivets or by adhesive bonding. Clamping means, such as a wheel brake cylinder 28, are arranged between the adjacent ends 30 and 32 of the shoes 12 and 14 respectively. An anchoring block 34 integral with the support plate 10 interacts with the other ends 36 and 38 of the shoes 12 and 14. Restoring springs 40 and 42 are arranged respectively in the vicinity of the wheel brake cylinder 28 and the anchoring block 34, in order to stress the ends 30 and 32 of the shoes against the wheel brake cylinder 28 and the ends 36 and 38 of the shoes against the anchoring block 34. A spacer 44 is mounted between the shoes 12 and 14 in the vicinity of the wheel brake cylinder 28, so as to define a distance which, at rest, separates the ends 30 and 32 of the shoes. The spacer 44 has an automatic adjustment device of the type described in patent application EP-A No. 0,77,726. The spacer 44 comprises two elements 46 and 48 which follow the movement of the shoes 12 and 14.

The drum brake has a mechanical control comprising a lever 50 articulated at one of its ends on a pin forming a pivot 52, mounted on the end 32 of the shoe 14, its other end 54 being connected to a control cable ending at a handbrake lever located in the cab of the vehicle. The lever 50 has a projection 56 which bears on the edge of the web 18 of the shoe 14 in order to define the rest position of the lever 50. The spacer 44, more specifically its element 48, is stressed against the lever 50 by means of the restoring spring 40 of the shoes. A restoring spring 58 of the handbrake lever 50 is mounted between the web 18 of the shoe 14 and an extension 60 of the element 48 of the spacer 44. The element 46 is attached to the shoe 12 by means of an attachment device designated as a whole by the reference 162.

To dismantle the brake illustrated in FIG. 1, for example for the purpose of replacing worn shoes, the lever 50 is depressed to sufficient extent to release the stop 56 laid against the web 18 of the shoe 14.

A first embodiment of the invention will now be described with reference to FIGS. 2 to 5.

In these FIGS. 2 to 5, the reference numerals already employed in FIG. 1 have been used to designate similar or identical elements.

Figure 2:
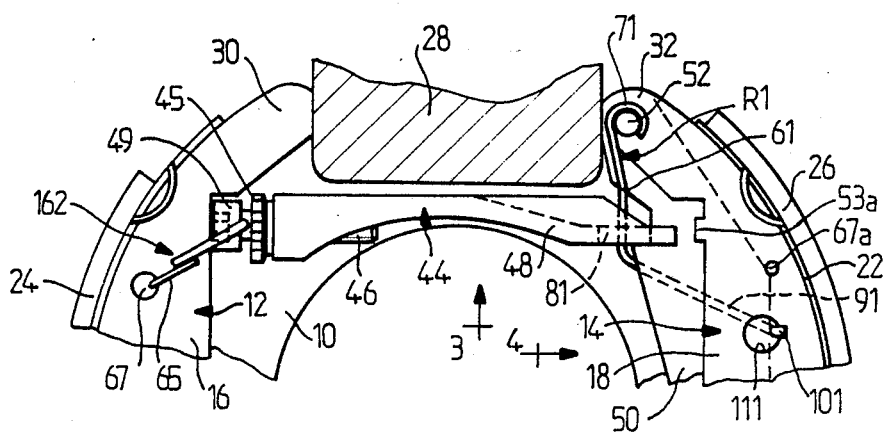
FIG. 2 is a partial view of a drum brake of the same type as that of FIG. 1, showing the improvements according to the invention.

For the sake of clarity, FIG. 2 does not show the spring (designated by 40 in FIG. 1) which stresses the ends 30 and 32 of the shoes 12 and 14 against the pistons of the wheel brake cylinder 28.

To perform the function of the spring 58 of FIG. 1, which stresses the spacer 44 towards the handbrake lever 50, a spring R1 having the form of a V with an obtuse angle is used. One branch 61 of the V has a free end curved in the form of a hook 71 which interacts with a radial groove made in the pin forming a pivot 52, to ensure that the latter is immobilized. The substantially straight branch 61 passes through a passage 81 made in the body 48 of the spacer 44. Beyond the vertex of the obtuse angle there is the other branch 91 of the V which is substantially straight and which terminates at its free end in a bent wire portion 101 substantially perpendicular to the branch 91.

Figure 4:
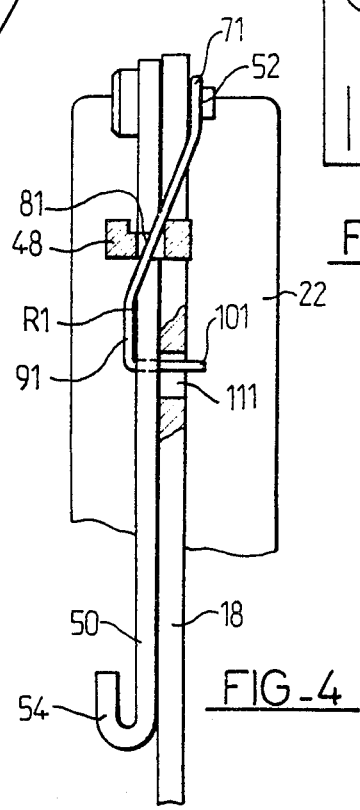
FIG. 4 is a view according to the arrow "4" of FIG. 2, showing, with portions cut away, the connection made by means of a spring between the shoe, the handbrake lever and the spacer.

As shown in FIG. 4, the branch 91 is laid against the outer face of the brake lever 50 opposite that which is in contact with the web 18 of the brake shoe. The portion 101 bent at 90° penetrates at its end into an orifice 111 made in the web 18. It will be seen that the bent portion 101 interacts by sheering stress between the web 18 and the lever 50 and performs the function of the stop 56 of FIG. 1.

It is very easy to assemble the brake of FIG. 2 which possesses the assembly spring R1. After the spring R1 has been inserted through the passage 81, assembly is carried out by attaching the hook 71 on the pivot 52, followed by the insertion of the portion 101 into the orifice 111, or vice versa. Dismantling can be carried out in reverse order to the assembly described above, or preferably by knocking out the bent portion 101 in the orifice 111 by means of a tool pushing on it.

The attachment device designated by the general reference 162 will now be described with reference to FIGS. 2, 3 and 5, and this differs from that described in EP-A No. 0,146,444 (FIG. 1 of the present application) in the following respects:

The element 46 consists essentially of a screw, with which interacts a nut 45 equipped with teeth on which a pawl 47 engages.

The screw 46 is mounted slideably in the body of the spacer 44. Its cylindrical head 49 has a hexagonal recess 51 (see FIG. 5), into which a projection 53 of the shoe 12 penetrates.

For reasons of symmetry in order to simplify production, this projection is also present at 53a on the shoe 14. The projection 53 is retained in the hexagonal recess 51 by means of a tension spring 65 which is anchored at one of its ends in an orifice 67 in the shoe 12 and which at its other end passes diametrically through the screw 46 in the vicinity of the head 49.

FIGS. 6 and 7 illustrate a device according to a second embodiment of the invention.

As shown in these Figures, the elastic wire spring R2 comprises two branches 62 and 92 extending substantially in the same plane. The branch 62 has, at its free end, a portion 72 bent in the form of a hook which interacts with a radial groove in the pivot 52 which it immobilizes axially. The branch 62, before reaching the vertex of the angle of the V, penetrates into a passage 82 formed laterally in the spacer 48. The free end of the branch 92, after being bent at 90° in the plane of the V, has a portion 94 terminating in an end 102 bent at 90° relative to the plane of the V and penetrating into an orifice 112 made in the web 18, against which extend the portions 92 and 94 of the second branch of the V-shaped spring R2. The end 102 projects beyond this orifice 112 so as to intercept the edge of the lever 50 (for which it forms the stop 56 of the known brake of FIG. 1).

The comments made with regard to the assembly and dismantling of the brake of FIGS. 2 to 5 also apply to the brake of FIGS. 6 and 7. It will be noted, however, that the passage 82 is open, thus making assembly and dismantling easier because of the elasticity of the spring.

Figure 8:
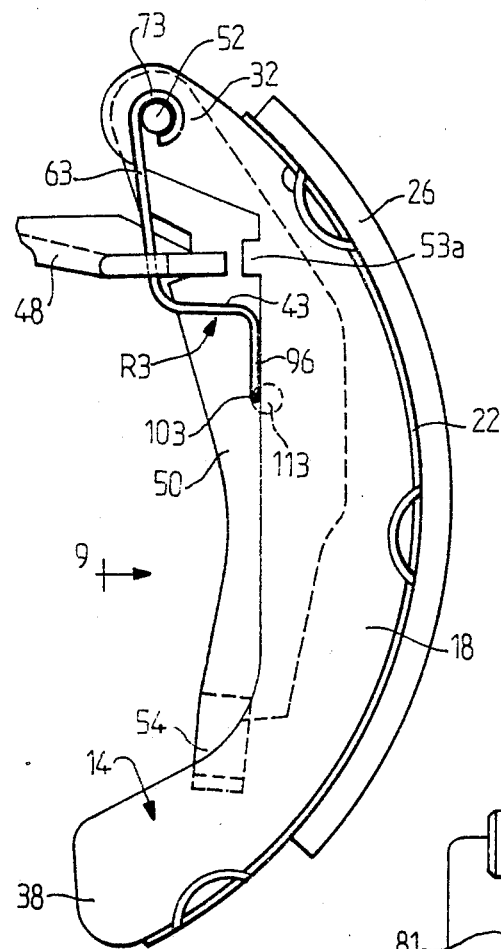
FIG. 8 shows a connection made by means of a spring between a shoe, the handbrake lever and the spacer according to a third embodiment.
Figure 9:
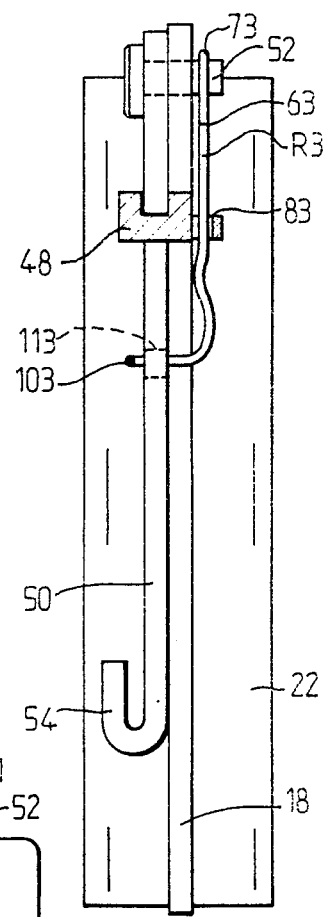
FIG. 9 is a view according to the arrow "9" of FIG. 8.

FIGS. 8 and 9 illustrate a device according to a third embodiment of the invention.

As shown in these Figures, the elastic wire spring R3 comprises two branches 63 and 93 extending substantially in the same plane. The branch 63 has, at its free end, a portion 73 curved in the form of a hook which interacts with a radial groove in the pivot 52 which it immobilizes axially.

The end of the branch 93, after being bent at 90° in the plane of the V, has a portion 96 terminating in an end 103 which is bent at 90° relative to the plane of the V and which penetrates into an orifice 113 made in the lever 50. The portions 93 and 96 of the second branch of the V-shaped spring R3 extend in a plane parallel to the web 18, and the portion 113, bent at 90° and inserted into the orifice 113 in the lever 50, exerts a shearing stress on the edge of the web 18 in order to perform the function of a stop for the lever 50 in the rest position on the web.

The invention is not limited to the embodiments described, and in particular it will be seen that it can be used perfectly well on a drum brake in which the spacer does not have any means of compensating the wear of the shoes.

We claim:

1. A spring for assembling a drum brake of the type comprising two shoes stressed towards the drum by a brake motor acting, counter to a restoring first spring, on first ends of the said shoes, while the other ends interact with an anchoring block, one of the shoes carrying a handbrake lever articulated on a pivot adjacent to the first end of the one shoe, the lever being connected to the other shoe by means of a spacer one end of which is laid against the lever by means of a second spring, the lever having a stop which interacts with the web of the one shoe and which acts counter to the second spring in order to define a rest position of the lever, characterized in that the second spring consists of a V-shaped elastic metal wire (R1, R2, R3) having one end of one branch of which forms a hook which engages the pivot to ensure retention of the lever thereon, the branch passing through a passage, provided in the spaces in order to stress the spaces elastically towards the lever in interaction with the other branch of the V which has means of anchoring on the web of the one shoe and the lever.

2. The spring for assembling a drum brake according to claim 1, characterized in that the anchoring means consist of a wire portion bent at 90° relative to a plane of the V and interacting with the web of the one shoe and the lever adjacent to the one shoe to constitute the means forming a stop.

* * * * *